US012771147B2

(12) United States Patent
Froeschl et al.

(10) Patent No.: US 12,771,147 B2
(45) Date of Patent: Oct. 20, 2026

(54) ENERGY STORAGE SYSTEM AND VEHICLE

(71) Applicants: Bayerische Motoren Werke Aktiengesellschaft, Munich (DE); Technische Universitaet Muenchen, Munich (DE)

(72) Inventors: Joachim Froeschl, Herrsching (DE); Jürgen Gebert, Moosburg (DE); Alfred Grom, Glonn (DE); Julian Taube, Munich (DE); Laurenz Tippe, Munich (DE)

(73) Assignees: Bayerische Motoren Werke Aktiengesellschaft, Munich (DE); Technische Universitaet Muenchen, Munich (DE)

( * ) Notice: Subject to any disclaimer, the term of this patent is extended or adjusted under 35 U.S.C. 154(b) by 824 days.

(21) Appl. No.: 18/024,697

(22) PCT Filed: Aug. 24, 2021

(86) PCT No.: PCT/EP2021/073396
§ 371 (c)(1),
(2) Date: Mar. 3, 2023

(87) PCT Pub. No.: WO2022/048953
PCT Pub. Date: Mar. 10, 2022

(65) Prior Publication Data

US 2024/0030721 A1 Jan. 25, 2024

(30) Foreign Application Priority Data

Sep. 4, 2020 (DE) ..................... 10 2020 123 183.0

(51) Int. Cl.
*H02J 7/50* (2026.01)
*H02J 1/102* (2026.01)
(Continued)

(52) U.S. Cl.
CPC ................ *H02J 7/50* (2026.01); *H02J 1/102* (2013.01); *H02J 7/40* (2026.01); *H02J 2105/30* (2026.01)

(58) Field of Classification Search
CPC ...... H02J 7/0013; H02J 1/102; H02J 7/00032; H02J 2310/40; H02J 2310/48; Y02T 10/70
(Continued)

(56) References Cited

U.S. PATENT DOCUMENTS 6,504,344 B1 1/2003 Adams et al.
8,571,738 B1 10/2013 Potter et al.
(Continued)

FOREIGN PATENT DOCUMENTS

DE 10 2005 025 616 A1 12/2006
DE 10 2005 041 746 A1 3/2007
(Continued)

OTHER PUBLICATIONS

International Search Report (PCT/ISA/210) issued in PCT Application No. PCT/EP2021/073396 dated Nov. 15, 2021 with English translation (six (6) pages).
(Continued)

*Primary Examiner* — Huy Q Phan
(74) *Attorney, Agent, or Firm* — Crowell & Moring LLP

(57) ABSTRACT

An energy storage system includes a first system energy interface, a first storage module, and a first processing module. The first storage module includes a first energy interface, a first cell stack comprising a plurality of individual cells, and a first communication interface. The first processing module includes a second energy interface, a second communication interface, a first monitoring module, a DC-10 DC converter, a third communication interface, and the first system energy interface. The system is configured to
(Continued)

electrically couple the first memory module to a second memory module depending on the first processing module and a second processing module.

10 Claims, 9 Drawing Sheets

(51) Int. Cl.
*H02J 7/40* (2026.01)
*H02J 105/30* (2026.01)

(58) Field of Classification Search
USPC .......................................................... 320/104
See application file for complete search history.

(56) References Cited

U.S. PATENT DOCUMENTS

| | | | | |
|---|---|---|---|---|
| 11,820,247 | B2 * | 11/2023 | Sharpe | H01M 8/0656 |
| 2007/0054156 | A1 | 3/2007 | Froeschl et al. | |
| 2011/0089760 | A1 | 4/2011 | Castelaz et al. | |
| 2013/0066572 | A1 * | 3/2013 | Terashima | H02J 7/0016 320/136 |
| 2014/0129164 | A1 | 5/2014 | Gorbold | |
| 2016/0261127 | A1 | 9/2016 | Worry et al. | |
| 2017/0214252 | A1 | 7/2017 | Preindl et al. | |
| 2018/0217206 | A1 | 8/2018 | Kiuchi | |
| 2019/0225072 | A1 | 7/2019 | Froeschl | |
| 2022/0024334 | A1 * | 1/2022 | Marczi | H02J 7/0013 |
| 2022/0029431 | A1 * | 1/2022 | McLean | B60L 3/0046 |
| 2022/0072962 | A1 * | 3/2022 | Maury | B60K 35/22 |
| 2022/0382240 | A1 * | 12/2022 | Frank | G05B 19/042 |

FOREIGN PATENT DOCUMENTS

| | | | |
|---|---|---|---|
| DE | 10 2010 026 608 | A1 | 1/2012 |
| DE | 10 2017 009 586 | A1 | 4/2018 |
| DE | 10 2016 224 199 | A1 | 6/2018 |
| WO | WO 2011/082854 | A2 | 7/2011 |

OTHER PUBLICATIONS

German-language Written Opinion (PCT/ISA/237) issued in PCT Application No. PCT/EP2021/073396 dated Nov. 15, 2021 (10 pages).

German-language Search Report issued in German Application No. 10 2020 123 183.0 dated Jun. 28, 2021 with partial English translation (10 pages).

* cited by examiner

ENERGY STORAGE SYSTEM AND VEHICLE

BACKGROUND AND SUMMARY

The invention relates to an energy storage system. The invention further relates to a vehicle.

Vehicles can have energy storage systems in the form of storage modules. The storage modules can be connected in series and/or in parallel.

One problem solved by the invention is to create a system that contributes to a safe as well as energy-efficient energy storage system. Furthermore, a corresponding vehicle is to be created.

The problem is solved by the features of the independent patent claims. Advantageous embodiments are characterized in the dependent claims.

According to a first aspect, the invention is characterized by an energy storage system.

According to the first aspect, the system comprises a first system energy interface for providing electrical energy at a first system output voltage. Further, the system comprises a first storage module for storing electrical energy. The first storage module comprises a first energy interface, a first cell stack, and a first communication interface. The first energy interface is configured to provide electrical energy at a first nominal voltage. The first cell stack comprises a plurality of individual cells. The first communication interface is configured to provide first monitoring data relating to a monitoring of the plurality of individual cells. Further, the system comprises a first processing module. The first processing module includes a second energy interface, a second communication interface, a first monitoring module, a DC-DC converter, a third communication interface, and the first system energy interface. The second communication interface is configured to receive the first monitoring data. The first monitoring module is configured to monitor the plurality of individual cells depending on the monitoring data. The third communication interface is configured to receive processing data from or provide processing data to a second processing module. The system is configured to electrically couple the first storage module to a second storage module depending on the first processing module and the second processing module.

The system according to the first aspect makes it possible to arrange or construct the energy storage system in a modular and variable manner. This is advantageous, for example, in order to simplify handling with respect to the energy storage device, in particular manufacturing of the energy storage device and/or replacement or repair of the corresponding modules or the like.

Furthermore, this makes it possible to separate the determination of the monitoring data from the monitoring of the several individual cells.

By the system according to the first aspect, it is further possible to adjust the first system output voltage depending on the modular arrangement of the energy storage device. In particular, the first system output voltage is dependent on an execution of the first processing module.

For example, the system according to the first aspect is particularly suitable for use as an energy storage device in a vehicle, such as for an on-board energy supply of the vehicle and/or for driving the vehicle. The vehicle may be any vehicle that requires an energy storage device, such as an electrically energized vehicle and/or a vehicle with an internal combustion engine.

For example, the system according to the first aspect is suitable for automated manufacturing, such as by a robot.

The system can be installed under seats of the vehicle, for example in a so-called sandwich construction.

The energy storage device can also be referred to as a vehicle battery or vehicle accumulator. The energy storage device or the first storage module and/or the second storage module can store electrical energy, for example by charging it appropriately, as well as provide it.

For example, the first storage module is designed as a common part. This means that higher numbers of storage modules can be manufactured, which can contribute to a reduction in production costs (so-called "economy of scale"). Furthermore, this means that, for example, only one type of storage module is required in the vehicle.

The system according to the first aspect is particularly advantageous compared to a system in which the first storage module is not implemented as a common part with respect to an energetic and data coupling, and in which the DC/DC converter of the first storage module, an individual cell monitoring, a balancing of the plurality of individual cells, a monitoring of the first cell stack or the sub-cell stacks and a balancing of the sub-cell stacks are arranged separately from each other and cannot be combined.

The multiple individual cells may be any individual cells, such as lithium-ion cells and/or double-layer capacitors and/or supercapacitors (so-called "supercaps"), and/or sodium-ion cells or the like.

The first system energy interface may be of any design, for example, in the form of a first terminal representative of a positive pole of the first system energy interface and a second terminal representative of a negative pole of the first system energy interface. The electrical energy or an electrical power of the system may be provided depending on the first terminal and the second terminal of the first system energy interface.

The first energy interface may be of any design, for example in the form of a first terminal representative of a positive terminal of the first storage module and a second terminal representative of a negative terminal of the first storage module. The electrical energy or an electrical power of the first storage module may be provided depending on the first terminal and the second terminal of the first storage module.

The second energy interface has the same properties as the first energy interface.

The voltages according to the first aspect and optional embodiments thereof are substantially DC voltages.

The first nominal voltage is a nominal voltage of the cell stack, such as 48 V or the like.

The first communication interface can be of any design, such as in the form of a plug-in contact and/or as a data bus or the like.

The first communication interface can also be referred to as the interface of the individual cell and module data sensor.

The second communication interface has the same properties as the first communication interface.

The monitoring data is representative of information from sensors for monitoring the plurality of individual cells, such as a respective cell voltage of an individual cell and/or a cell temperature of the individual cell, or the like.

The DC/DC converter is designed to provide galvanic isolation for a given nominal power. The DC/DC converter can be arranged together with the first monitoring module in one unit or in an independent unit, for example on a printed circuit board.

For example, the DC-DC converter can be electrically and/or mechanically coupled to the first processing module via a corresponding plug-in contact.

For example, the DC/DC converter is designed as a common part. This means that higher numbers of DC/DC converters can be manufactured, which can contribute to a reduction in production costs (so-called "economy of scale"). Furthermore, this allows the DC-DC converter to be replaced efficiently and easily. Thus, a configuration of the first processing module can be easily configured.

For example, the DC-DC converter can be manufactured as an assembly option during the manufacture of the energy storage device and/or the replacement or repair of the corresponding modules or the like, with different predetermined power ratings, such as 500 W or 200 W or the like.

The DC-DC converter can also be any other device designed to provide galvanic isolation for the specified nominal power.

For example, the first processing module may also include a plurality of DC-DC converters configured accordingly.

The first processing module can be electrically and/or mechanically coupled to the first storage module. The first processing module is formed as a connection unit between the first storage module and the second processing module. For example, the first storage module and the second storage module can thus be arranged side by side on a horizontal plane in the vehicle.

For example, the first monitoring module includes a processor and/or circuitry for monitoring the plurality of individual cells.

Depending on the third communication interface, the processing data can be received from or provided by the second processing module via a data bus. The data bus can, for example, be implemented with corresponding flat conductors and/or foil conductors. For example, depending on the data bus, the first processing module and/or the second processing module may or may not be connected to an energy management system of the vehicle and provide the processing data to it or receive the processing data from it. The energy management system is designed to monitor and/or control and/or react in the event of a fault in the first and/or the second processing module and/or the system.

Depending on the processing data, the system can be controlled and/or diagnosed and/or monitored.

Further, the system is configured to electrically couple the first storage module to a plurality of second storage modules.

According to an optional embodiment of the first aspect, the system comprises the second storage module and the second processing module.

The second storage module and/or a further storage module has or have the same features as the first storage module, i.e. the second storage module and/or the further storage module comprises or comprise the same interfaces and/or modules or the like as the first storage module. For example, the second storage module includes a fourth energy interface, a second cell stack, and a fourth communication interface. The second processing module includes the same features as the first processing module, i.e., the second storage module includes the same interfaces and/or modules or the like as the first processing module.

This makes it possible to arrange or construct the energy storage system in a modular and variable manner. Furthermore, the storage capacity of the energy storage system can be expanded easily and efficiently.

Furthermore, this makes it possible to provide the on-board energy supply depending on the distributed DC/DC converters of the first and second storage modules.

For the sake of simplicity, the following optional embodiments are only described for the first storage module. However, these can also be correspondingly present in the second storage module and/or a further storage module and have corresponding effects.

The system may also include a plurality of second storage modules and a corresponding plurality of second processing modules.

According to another optional embodiment of the first aspect, the first cell stack comprises a plurality of sub-cell stacks. The plurality of sub-cell stacks are connected in series and/or in parallel. The sub-cell stacks comprise the plurality of individual cells. The sub-cell stacks are configured to each provide electrical energy at a second nominal voltage. The second nominal voltage is substantially less than or equal to the first nominal voltage. The first cell stack includes, for each sub-cell stack, a respective DC-DC converter and a respective sub-cell stack monitoring module configured to monitor the respective sub-cell stack.

This makes it possible to arrange or construct the first storage module in a modular and variable manner.

The second nominal voltage is a nominal voltage of the sub-cell stack, such as 12 V or the like.

The DC-DC converter is designed to provide galvanic isolation and is designed for use with the second nominal voltage.

The respective DC-DC converter may be arranged together with the respective sub-cell stack monitoring module in one assembly or in a stand-alone assembly.

The respective DC-DC converter may also be any other device designed to provide galvanic isolation.

For example, the respective DC-DC converters and/or the respective sub-cell stack monitoring modules are designed to balance the sub-cell stacks, in particular with respect to the second nominal voltage.

For example, the first cell stack includes respective DC rails for balancing the sub-cell stacks with respect to the second nominal voltage. The DC rails are electrically coupled to the sub-cell stacks depending on the respective DC-DC converters.

According to another optional embodiment of the first aspect, the first storage module comprises a third energy interface. The third energy interface is configured to provide electrical energy at the second nominal voltage.

For example, in this case, the system also includes another system energy interface for providing electrical energy at the second nominal voltage.

This makes it possible to provide electrical energy at the second nominal voltage. This is particularly advantageous for applications in which electrical energy is required at a voltage that is not equal to the first system output voltage and/or not equal to the first nominal voltage. Such an application may include any system of the vehicle, such as an anti-theft alarm system or the like, which requires electrical energy at a predetermined minimum voltage in an emergency.

For example, electrical energy is provided at the second nominal voltage depending on the DC rails of the first cell stack.

According to a further optional embodiment of the first aspect, each of the sub-cell stacks comprises a subset of the plurality of individual cells. The individual cells of the respective subset are connected in series and/or in parallel. Each of the sub-cell stacks comprises, for each individual cell of the respective subset, a respective DC-DC converter and a respective cell monitoring module configured to monitor the respective individual cell.

This makes it possible to arrange or construct the sub-cell stacks in a modular and variable manner.

The individual cells are each configured to provide electrical energy at a third nominal voltage. The third nominal voltage is substantially less than or equal to the second nominal voltage.

The third nominal voltage is a nominal voltage of the individual cells, such as 3 V or the like.

The DC-DC converter is designed to provide galvanic isolation and is designed for use with the third nominal voltage.

The respective DC/DC converter can be arranged together with the respective cell monitoring module in one assembly unit or in an independent assembly unit.

For example, the monitoring data is determined or provided depending on the respective cell monitoring modules.

For example, the DC-DC converter is a micro DC-DC converter designed for a nominal current in a mA range.

The respective DC-DC converter may also be any other device designed to provide galvanic isolation.

For example, the respective DC/DC converters and/or the respective cell monitoring modules are designed to balance the individual cells of the respective subset, in particular with respect to the third nominal voltage.

For example, the sub-cell stacks include respective DC rails for balancing the individual cells with respect to the third nominal voltage. The DC rails are electrically coupled to respective subsets of the plurality of individual cells depending on the respective DC-DC converters.

According to another optional embodiment of the first aspect, depending on the first processing module and the second processing module, the first storage module and the second storage module are electrically coupled such that the first storage module and the second storage module are connected in parallel.

For example, depending on the electrical coupling of the first storage module and the second storage module, the first system output voltage is substantially equal to the first nominal voltage. This is particularly the case when the energy storage device is substantially fully charged.

This makes it possible to design the energy storage system in a modular and variable way. Furthermore, it is possible to increase the electrical power that the system can provide depending on the first system energy interface. A value of the electrical power that the system can provide depending on the first system energy interface can in this case be proportional to a number of storage modules that the system comprises, such as a first storage module and a plurality of second storage modules.

According to another optional embodiment of the first aspect, depending on the first processing module and the second processing module, the first storage module and the second storage module are electrically coupled such that the first storage module and the second storage module are connected in series.

For example, depending on the electrical coupling of the first storage module and the second storage module, the first system output voltage is substantially greater than the first nominal voltage. This is particularly the case when the energy storage device is substantially fully charged.

In this case, the system may be used for a high voltage application, such as to drive the vehicle. For example, a value of the first system output voltage for the high voltage application is substantially 400 V or the like.

This makes it possible to construct the energy storage system modularly and variably for the high-voltage application. Furthermore, it is possible to increase the first system output voltage that the system can provide depending on the first system energy interface. A value of the first system output voltage, in this case, may be proportional to a number of storage modules that the system comprises, such as a first storage module and a plurality of second storage modules.

This is advantageous, for example, over a case where the system has a storage module where the nominal voltage of the cell stack is sized for the high voltage application.

For example, in this case the first system energy interface is designed with corresponding high-voltage connection terminals.

According to another optional embodiment of the first aspect, the system comprises a second system energy interface for providing electrical energy at a second system output voltage.

The second system energy interface has the same characteristics as the first system energy interface.

The second system energy interface is configured to provide electrical energy at a second system output voltage.

The second system output voltage is substantially equal to the first nominal voltage. This is particularly the case when the energy storage device is substantially fully charged.

This allows the second system output voltage to be provided even when the first storage module and the second storage module are connected in series, and the first system output voltage is substantially greater than the first nominal voltage. This is advantageous, for example, when a first system of the vehicle, such as the drive of the vehicle, requires a supply voltage substantially equal to the first system output voltage, and a second system of the vehicle, requires a supply voltage substantially equal to the second system output voltage.

For example, the first processing module and/or the second processing module includes the second system energy interface.

According to another optional embodiment of the first aspect, the system comprises a third storage module and a third processing module. The second system output voltage is provided depending on the third storage module.

The third storage module has the same features as the first storage module, i.e., the third storage module includes the same interfaces and/or modules or the like as the first storage module.

The system may also include a plurality of third storage modules and a corresponding plurality of third processing modules.

This makes it possible to design the energy storage system in a modular and variable way. Furthermore, it is possible to increase the electrical power that the system can provide depending on the second system energy interface. A value of the electrical power that the system can provide depending on the second system energy interface can in this case be proportional to a number of third storage modules that the system comprises.

For example, in this case, the third processing module includes the second system energy interface.

According to a second aspect, the invention is characterized by a vehicle. The vehicle comprises the energy storage system according to the first aspect.

For example, the vehicle is the vehicle according to the first aspect.

Optional embodiments of the first aspect may also be correspondingly present in the further aspects and have corresponding effects.

Examples of embodiments of the invention are explained in more detail below with reference to the schematic drawings.

Elements of the same design or function are marked with the same reference signs across all figures.

DETAILED DESCRIPTION OF THE DRAWINGS

Figure 1:
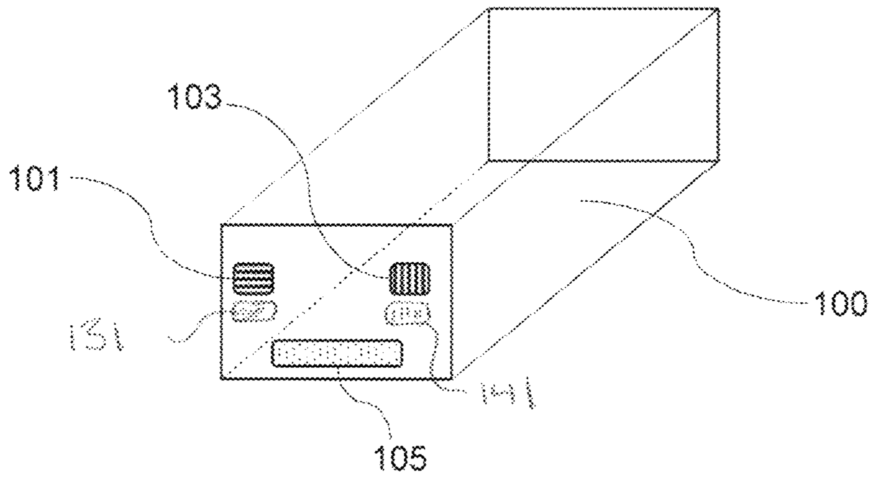
FIG. 1 is a schematic drawing of a storage module.

FIG. 1 shows a schematic drawing of a storage module 100. The storage module 100 includes an energy interface configured to provide electrical energy at a first nominal voltage. The energy interface is in the form of a first terminal 101 representative of a positive terminal of the storage module 100, and a second terminal 103 representative of a negative terminal of the storage module 100. Further, the storage module 100 includes a first communication interface 105.

For example, the first communication interface 105 may be configured to provide first monitoring data.

For example, the first communication interface can be of any design, such as in the form of a plug-in contact and/or as a data bus or the like.

For example, the first nominal voltage is a DC voltage and a value of the first nominal voltage is substantially 48 V.

For example, the storage module 100 may include a cell stack 200 for providing and/or storing electrical energy. For example, the cell stack 200 may include a plurality of individual cells 400.

For example, the plurality of individual cells may be any individual cells, such as lithium-ion cells and/or double-layer capacitors and/or supercapacitors (so-called "super-caps"), and/or sodium-ion cells or the like.

Figure 2:
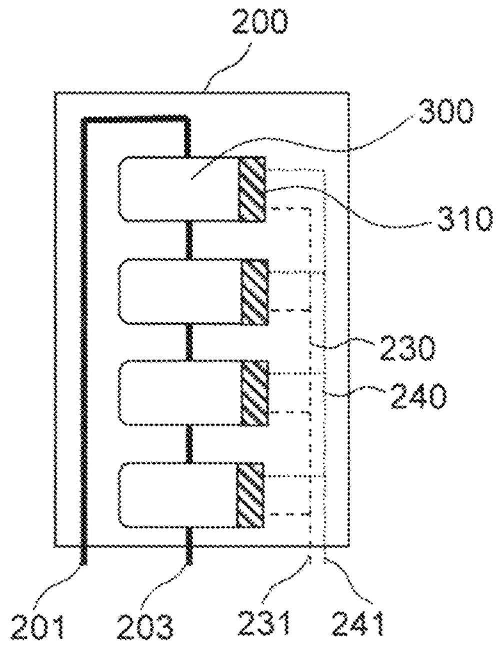
FIG. 2 is a schematic drawing of a cell stack.

FIG. 2 shows a schematic drawing of the cell stack 200. The cell stack 200 includes a plurality of sub-cell stacks 300 connected in series.

For example, the sub-cell stacks 300 may be configured to each provide electrical energy at a second nominal voltage.

The sub-cell stacks 300 include the plurality of individual cells 400. For each sub-cell stack 300, the first cell stack 200 includes a respective DC-DC converter 310 and a respective sub-cell stack monitoring module 310. The respective DC-DC converter 310 and the respective sub-cell stack monitoring module 310 are formed together in a structural unit.

For example, the respective sub-cell stack monitoring module 310 may be configured to monitor the respective sub-cell stack 300.

For example, the second nominal voltage is a DC voltage and a value of the first nominal voltage is substantially 12 V.

Further, the cell stack 200 includes two DC rails 230, 240 for balancing the sub-cell stacks 300 with respect to the second nominal voltage. The DC rails 230, 240 are electrically coupled to the sub-cell stacks 300 via respective DC-DC converters 310.

Further, to provide electrical energy at the first nominal voltage, the cell stack includes a first terminal 201 representative of a positive terminal of the cell stack 200 and a second terminal 203 representative of a negative terminal of the cell stack 200.

Optionally, to provide electrical energy at the second nominal voltage, the cell stack 200 includes a first terminal 231 representative of a positive terminal of the cell stack 200 and a second terminal 241 representative of a negative terminal of the cell stack 200. The terminal 231 is electrically coupled to the DC rail 230. The terminal 241 is electrically coupled to the DC bus 240.

For example, electrical potentials of the connection terminals 231, 241 or the DC rails 230, 240 are electrically isolated from electrical potentials of the connection terminals 201, 203.

For example, the storage module 100 may include a third energy interface 131, 141. The third energy interface may be configured to provide electrical energy at the second nominal voltage depending on the terminals 231, 241.

Figure 3:
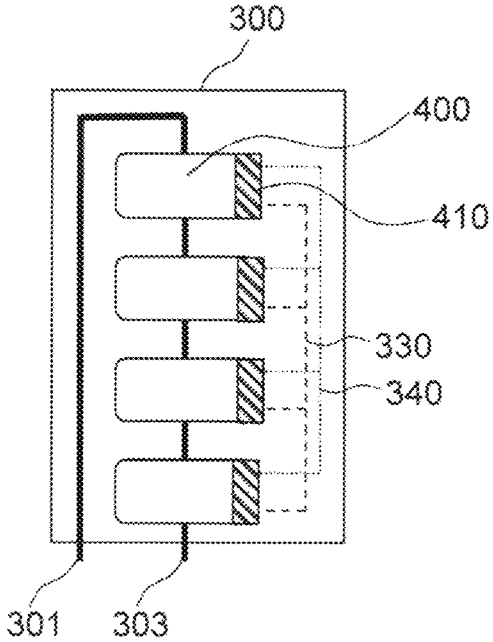
FIG. 3 is a schematic drawing of a sub-cell stack.

FIG. 3 shows a schematic drawing of a sub-cell stack 300. The sub-cell stack 300 includes a subset of four of the plurality of individual cells 400 connected in series.

For example, the individual cells 400 of the subset may be configured to each provide electrical energy at a third nominal voltage.

The first sub-cell stack 300 includes, for each individual cell 400 of the subset, a respective DC-DC converter 410 and a respective sub-cell stack monitoring module 410. The respective DC-DC converter 410 and the respective cell monitoring module 410 are formed together in a structural unit.

For example, the respective sub-cell stack monitoring module 410 may be configured to monitor the respective individual cell 400.

For example, the third nominal voltage is a DC voltage and a value of the first nominal voltage is substantially 3 V.

Further, the sub-cell stack 300 includes two DC rails 330, 340 for balancing the individual cells 400 with respect to the third nominal voltage. The DC rails 330, 340 are electrically coupled to the individual cells 400 via respective DC-DC converters 410.

Further, to provide electrical energy at the first nominal voltage, the sub-cell stack 300 includes a first terminal 301 representative of a positive terminal of the sub-cell stack 300 and a second terminal 303 representative of a negative terminal of the sub-cell stack 300.

For example, electrical potentials of the DC rails 330, 340 are electrically isolated from electrical potentials of the terminals 301, 303.

Figure 4:
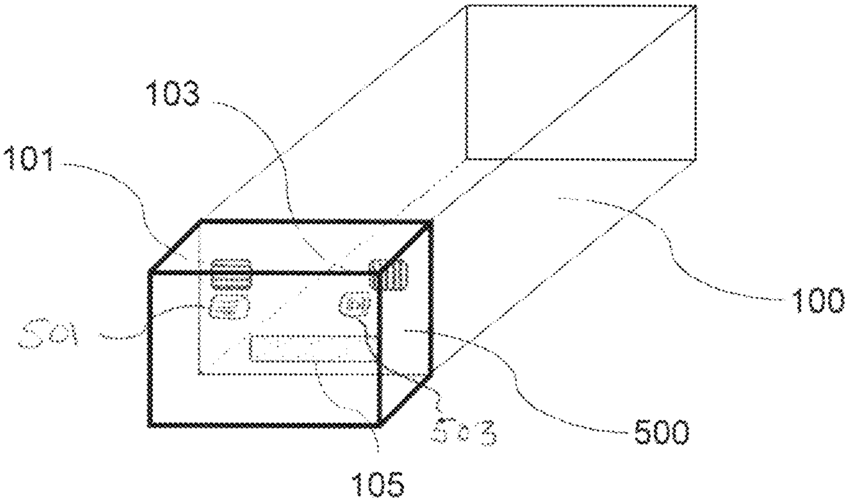
FIG. 4 is a schematic drawing of an energy storage system.

FIG. 4 shows a schematic drawing of an energy storage system for providing electrical energy. The system includes the storage module 100 shown in FIG. 1. The system further comprises a processing module 500.

For example, the processing module 500 may include a second energy interface, 501, 503, a second communication interface, a first monitoring module, a DC-DC converter, a third communication interface, and a first system energy interface.

The second communication interface has the same characteristics as the first communication interface 105.

For example, the first system energy interface may be of any design, such as a first terminal representative of a positive terminal of the first system energy interface and a second terminal representative of a negative terminal of the first system energy interface. The electrical energy or an electrical power of the system may be provided depending on the first terminal and the second terminal of the system.

For example, the system can store electrical energy, such as by charging it appropriately, as well as provide it.

The processing module 500 is able to be coupled electrically and/or mechanically to the storage module 100.

Figure 5:
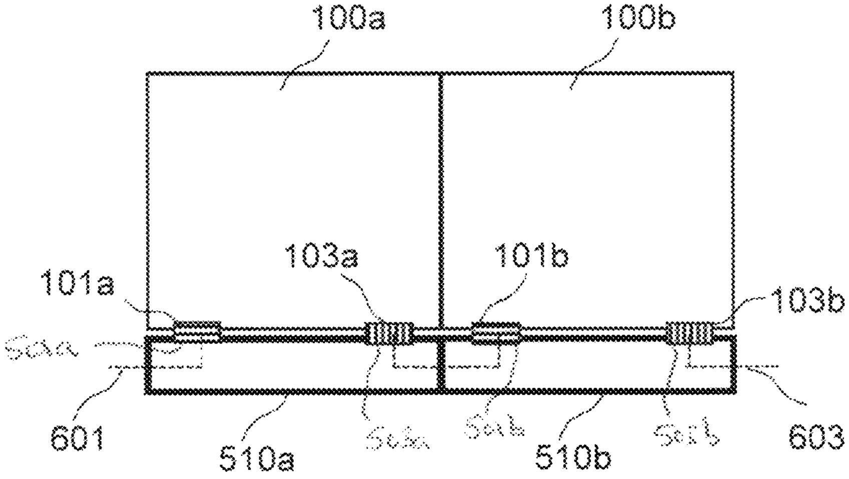
FIG. 5 is a first schematic drawing of a first system.

FIG. 5 shows a first schematic drawing of a first system. The first schematic drawing of the first system is representative of a two-dimensional orthogonal projection in the form of a top view of the first system.

The first distributed system includes a first storage module 100*a*, a second storage module 100*b*, a first processing module 510*a*, and a second processing module 510*b*.

The first storage module 100*a* and the second storage module 100*b* each have the same characteristics as the storage module 100 shown in FIG. 1.

The first processing module 510*a* and the second processing module 510*b* each have the same characteristics as the processing module 500 shown in FIG. 4.

The first processing module is electrically coupled via its second energy interface 501*a*, 501*b* to the storage module 100*a* depending on terminals 101*a*, 103*a* of the storage module 100*a*. The second processing module 510*b* is electrically coupled via its second energy interface 501*b*, 503*b* to the storage module 100*b* depending on terminals 101*b*, 103*b* of the storage module 100*a*.

Depending on the first processing module 510*a* and the second processing module 510*b*, the first storage module 100*a* and the second storage module 100*b*, are electrically coupled such that the first storage module 100*a* and the second storage module 100*b* are connected in series.

The first processing module 510*a* and the second processing module 510*b* are configured for this specific electrical coupling of the series circuit.

For example, depending on the electrical coupling of the first storage module 100*a* and the second storage module 100*b*, a first system output voltage of the first system is substantially greater than a first nominal voltage of the first storage module 100*a* or the second storage module 100*b*.

For example, a value of the first system output voltage in this case is substantially twice as high as a value of the first nominal voltage, and thus 96 V.

For example, the first system may be used for a high-voltage application, such as driving a vehicle.

The dashed lines shown in the first processing module 510*a* and the second processing module 510*b* are representative of power contacts for electrically coupling the series circuit.

Figure 6:
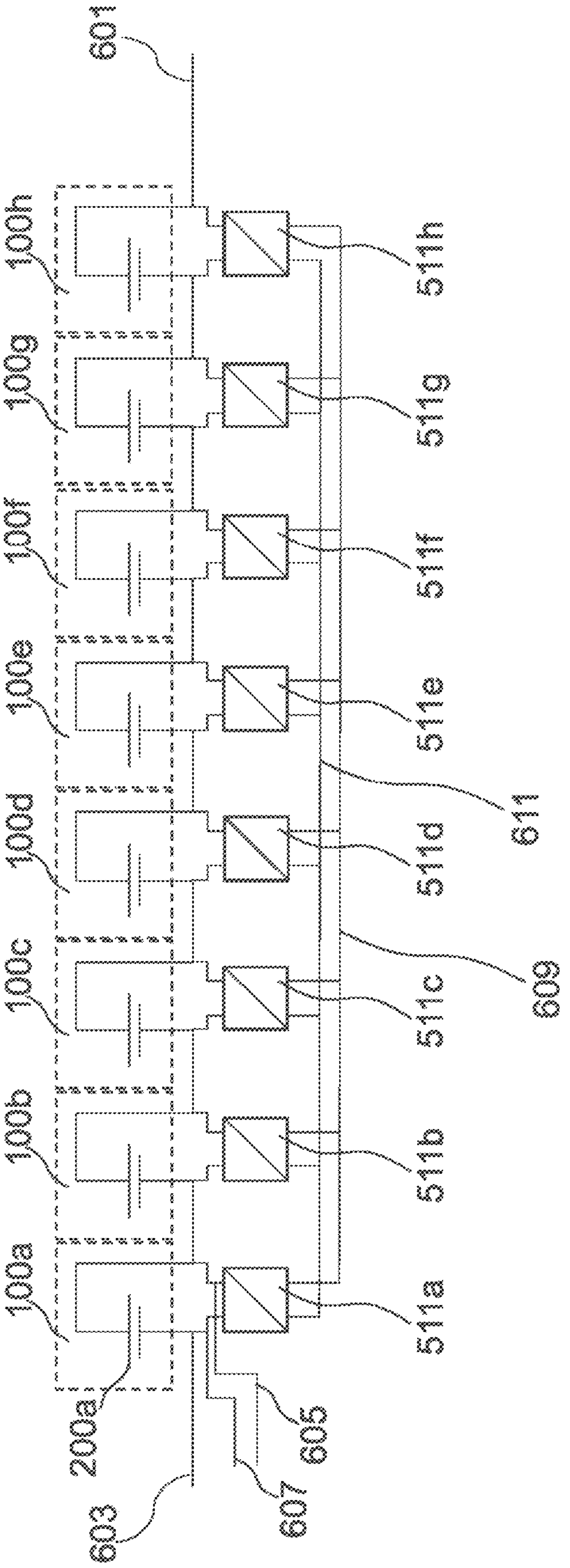
FIG. 6 is a second schematic drawing of the first system.

FIG. 6 shows a second schematic drawing of the first system. The second schematic drawing of the first system is representative of a circuit diagram or block diagram of the first system.

According to FIG. 6, the first system additionally comprises further second storage modules 100*c*, 100*d*, 100*e*, 100*f*, 100*g*, 100*h*, as well as corresponding further second processing modules, which, however, are not explicitly shown for reasons of clarity.

The further storage modules 100*c*-100*h* have the same properties as the storage module 100 according to FIG. 1. The further second processing modules have the same properties as the processing module 500 according to FIG. 4.

The first processing module 510*a* has a DC-DC converter 511*a*. The second processing module 510*b* has a DC-DC converter 511*b*. The other second processing modules each have DC-DC converters 511*c*, 511*d*, 511*e*, 511*f*, 511*g*, 511*h*.

The first storage module 100*a* comprises a cell stack 200*a*. The second storage module 100*b* and the further second storage modules 100*c*-100*h* also have respective cell stacks.

Depending on the first processing module 510*a*, the second processing module 510*b* and the further second processing modules, the storage modules 100*a*-100*h* are electrically coupled such that they are connected in series.

For example, a value of the first system output voltage in this case is substantially twice as high as a value of the first nominal voltage, and thus 96 V.

The first system includes a first system energy interface for providing electrical energy at a first system output voltage, which is in the form of a first terminal 601 representative of a positive terminal of the first system energy interface and a second terminal 603 representative of a negative terminal of the first system energy interface.

Referring to FIG. 6, the first system includes eight storage modules 100*a*-100*h*. For example, a value of the first system output voltage in this case is substantially eight times a value of the first nominal voltage, and thus 384 V.

This allows for N storage modules, where N is a positive integer, to increase the first system output voltage such that its value is substantially N times the value of the first nominal voltage.

The first system includes a second system energy interface for providing electrical energy at a second system output voltage, the second system energy interface being in the form of a first terminal 605 representative of a positive terminal of the second system energy interface and a second terminal 607 representative of a negative terminal of the second system energy interface.

Further, the first system includes two DC rails 609, 611 for balancing the storage modules 100*a*-100*h* with respect to the first nominal voltage. The DC rails 609, 611 are electrically coupled to the storage modules 100*a*-100*h* via respective DC-DC converters 511*a*-511*h*.

For example, the DC rails 609, 611 or parts of the DC rails 609, 611 are arranged in a structural unit with the respective processing modules.

For example, electrical potentials of the DC rails 609, 611 are electrically isolated from electrical potentials of the connection terminals 601, 603 or the connection terminals 605, 607.

For example, a value of the second system output voltage shown in FIG. 6 is substantially the same as a value of the first nominal voltage, and thus 48 V.

The terminals 605, 607 are electrically coupled to terminals of the first storage module 100*a*. For example, in this case, an electrical energy that the first system can provide depending on the second system energy interface depends on an electrical energy that the first storage module 100*a* can provide.

Alternatively, the terminals 605, 607 may be electrically coupled to the DC rails 609, 611 and not to the terminals of the first storage module 100*a*. For example, in this case, an electrical power that the first system can provide depending on the second system energy interface depends on predetermined nominal powers of the DC-DC converters 511*a*-511*h* or the sum of the respective predetermined nominal powers. For example, in this case, electrical potentials of the DC rails 609, 611 or the connection terminals 605, 607 are electrically isolated from electrical potentials of the.

Figure 7:
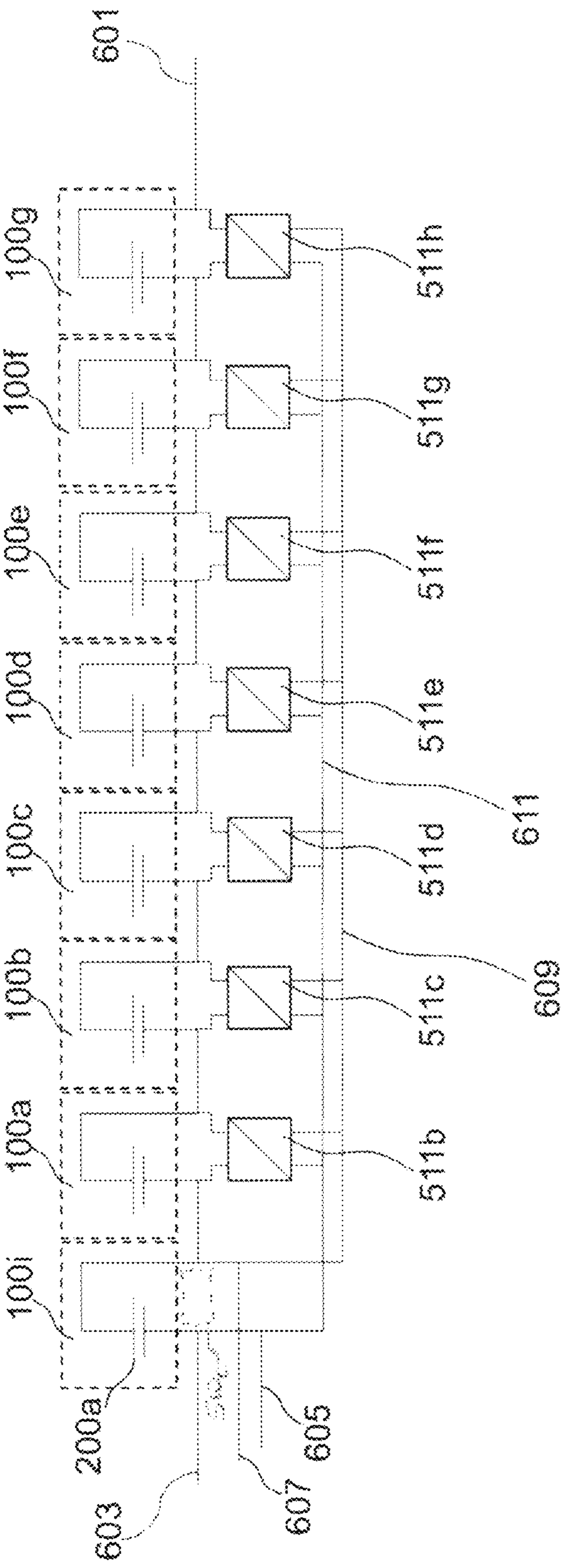
FIG. 7 is a third schematic drawing of the first system.

FIG. 7 shows a third schematic drawing of the first system. The third schematic drawing of the first system is representative of a further circuit diagram or block diagram of the first system.

According to FIG. 7, compared to FIG. 6, the first system additionally comprises a third storage module 100*i*, as well as a corresponding third processing module 510*c*, which, however, is not explicitly shown for reasons of clarity.

The third storage module 100*i* has the same characteristics as the storage module 100 according to FIG. 1. The third processing module has the same characteristics as the processing module 500 according to FIG. 4.

Further, the first system shown in FIG. 7 does not include the storage module 100*h* and the corresponding processing module.

Referring to FIG. 7, the first system includes eight storage modules 100*a*-100*g* and 100*i*. For example, the value of the first system output voltage in this case is substantially eight times a value of the first nominal voltage, and thus is 384 V.

Terminals 605, 607 are electrically coupled to terminals of the third storage module 100*i* as well as to the DC rails 609, 611.

For example, in this case, the electrical power that the first system can provide depending on the second system energy interface depends on the electrical power that the third storage module 100*i* can provide and additionally depends on the predetermined nominal powers of the DC-DC converters 511*a*-511*g* or the sum of the respective predetermined nominal powers.

For example, this makes it possible to increase the electrical power that the first system can provide depending on the second system energy interface compared to the embodiment according to FIG. 7.

For example, the predetermined nominal powers of the DC-DC converters 511*a*-511*h* are 500 W each, and the electrical power that the third storage module 100*i* can provide is 5 kW.

According to the embodiment shown in FIG. 6, the electrical power that the system can provide depending on the second system energy interface is 4 kW at 48 V. According to the embodiment shown in FIG. 7, the electrical power that the system can provide depending on the second system energy interface is 8.5 kW at 48 V.

The electrical potentials of the DC rails 609, 611 are not electrically isolated from electrical potentials of the connection terminals 605, 607.

Furthermore, according to FIG. 7, the potential of the connection terminal 603 is not galvanically isolated from the potential of the connection terminal 607. This can also be referred to as the common ground potential of the first system energy interface and the second system energy interface.

Additionally or alternatively, the third processing module may include a DC to DC converter that may be used to electrically couple the third storage module 100*i* to the DC rails 609, 611.

Figure 8:
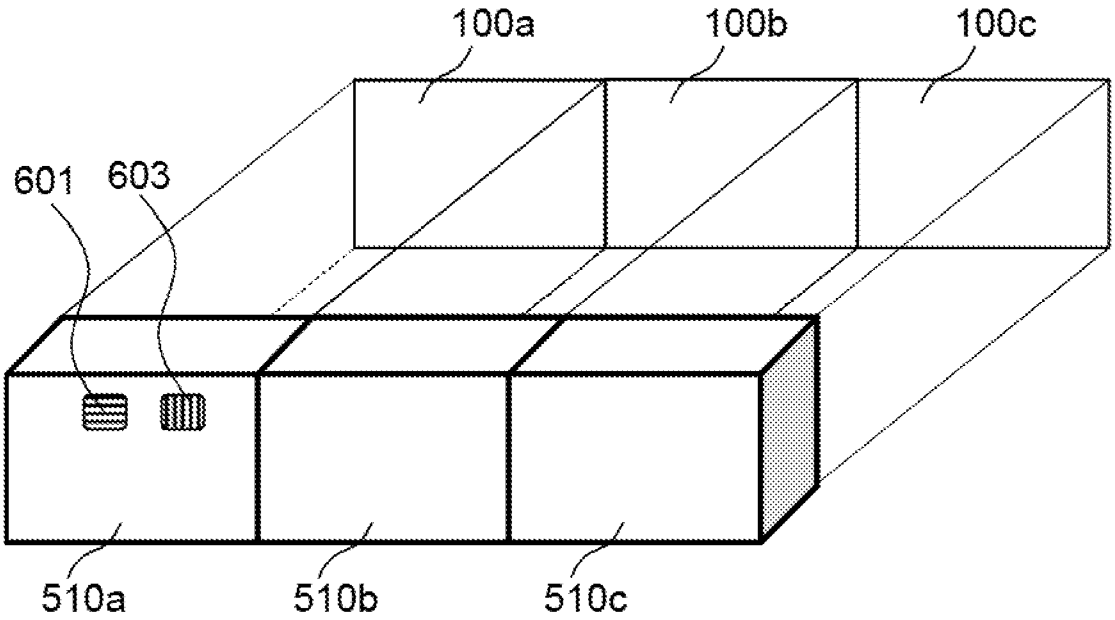
FIG. 8 is a fourth schematic drawing of the first system.

FIG. 8 shows a fourth schematic drawing of the first system. The fourth schematic drawing of the first system is representative of a three-dimensional projection of the first system.

For clarity, only the storage modules 100*a*-100*c*, and the processing modules 510*a*-510*c* are explicitly shown.

Furthermore, the first system according to FIG. 8 comprises the first system energy interface in the form of the terminals 601, 603.

For example, in this case the terminals 601, 603 are designed as corresponding high-voltage terminals.

The storage modules 100*a*-100*c*, and the processing modules 510*a*-510*c* are electrically and/or mechanically coupled with corresponding electrical and/or mechanical contacts.

Figure 9:
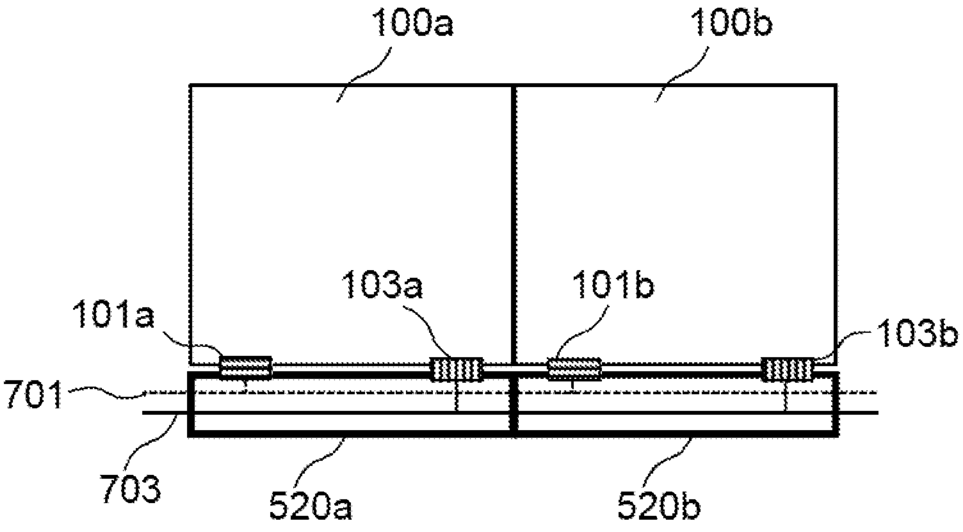
FIG. 9 is a first schematic drawing of a second system.

FIG. 9 shows a first schematic drawing of a second system. The first schematic drawing of the second system is representative of a two-dimensional orthogonal projection in the form of a top view of the second system.

The second distributed system includes the first storage module 100*a*, the second storage module 100*b*, a first processing module 520*a*, and a second processing module 520*b*.

The first storage module 100*a* and the second storage module 100*b* each have the same characteristics as the storage module 100 shown in FIG. 1.

The first processing module 520*a* and the second processing module 520*b* each have the same characteristics as the processing module 500 shown in FIG. 4.

The first processing module 520*a* is electrically coupled to the storage module 100*a* depending on terminals 101*a*, 103*a* of the storage module 100*a*. The second processing module 520*b* is electrically coupled to the storage module 100*b* dependent on terminals 101*b*, 103*b* of the storage module 100*a*.

Depending on the first processing module 520*a* and the second processing module 520*b*, the first storage module 100*a* and the second storage module 100*b*, are electrically coupled such that the first storage module 100*a* and the second storage module 100*b* are connected in parallel.

In contrast to the embodiment according to FIG. 5, the first processing module 520*a* and the second processing module 520*b* are designed for this specific electrical coupling of the parallel circuit.

For example, depending on the electrical coupling of the first storage module 100*a* and the second storage module 100*b*, a first system output voltage of the first system is substantially equal to a first nominal voltage of the first storage module 100*a* or the second storage module 100*b*.

For example, the value of the first system output voltage in this case is substantially equal to the value of the first nominal voltage, and thus 48 V.

The dashed lines shown in the first processing module 520*a* and the second processing module 520*b* are representative of energy contacts for electrically coupling the parallel circuit.

For example, the energy contacts are designed as power rails (so-called "power-rails") and are arranged in a structural unit with the processing modules 520*a*, 520*b*.

Figure 10:
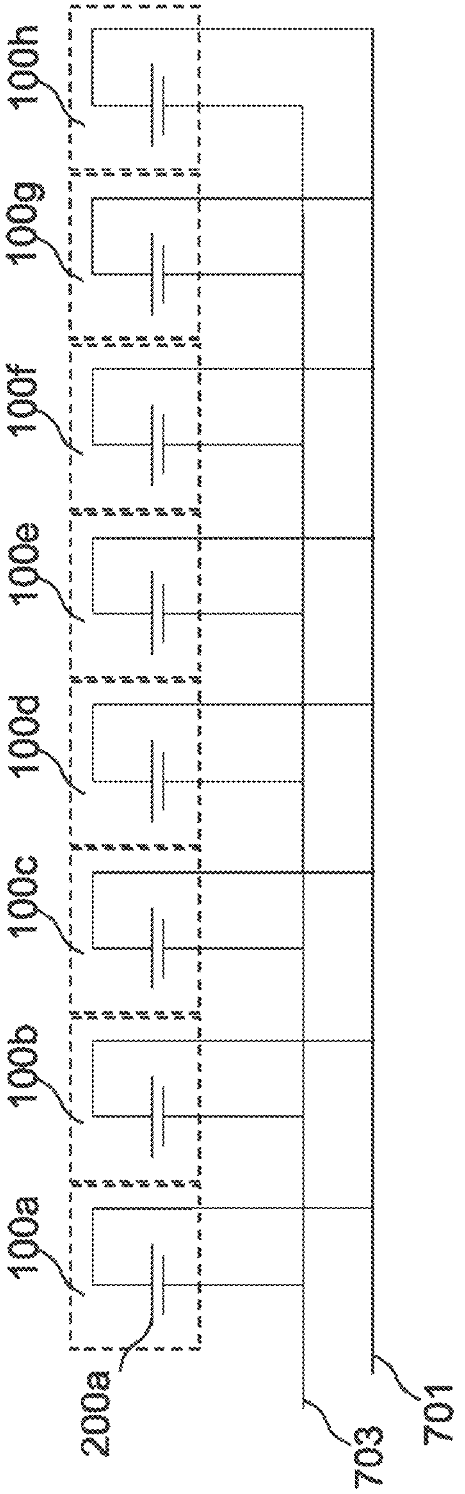
FIG. 10 is a second schematic drawing of the second system.

FIG. 10 shows a second schematic drawing of the second system. The second schematic drawing of the first system is representative of a circuit diagram or block diagram of the second system.

According to FIG. 10, the second system additionally comprises further second storage modules 100*c*, 100*d*, 100*e*, 100*f*, 100*g*, 100*h*, as well as corresponding further second processing modules, which, however, are not explicitly shown for reasons of clarity.

The further storage modules 100*c*-100*h* have the same properties as the storage module 100 according to FIG. 1. The further second processing modules have the same properties as the processing module 500 according to FIG. 4.

The first storage module 100*a* comprises a cell stack 200*a*. The second storage module 100*b* and the further second storage modules 100*c*-100*h* also have respective cell stacks.

Depending on the first processing module 520*a*, the second processing module 520*b*, and the further second processing modules, the storage modules 100*a*-100*h*, are electrically coupled such that they are connected in parallel.

For example, the value of the first system output voltage in this case is substantially the same as the value of the first nominal voltage, and thus 48 V.

The second system includes the first system energy interface for providing electrical energy at a first system output voltage, which is in the form of a first terminal 701 representative of a positive terminal of the first system energy interface and a second terminal 703 representative of a negative terminal of the first system energy interface.

Referring to FIG. 10, the second system includes eight storage modules 100*a*-100*h*.

For example, in this case, the electrical power that the first system can provide depending on the first system energy interface depends on electrical powers that the storage modules 100*a*-100*h* can provide.

For example, this makes it possible to increase the electrical power that the second system can provide depending on the first system energy interface at the first nominal voltage compared to the electrical power that the first system can provide according to the embodiments according to FIGS. 6 and 7, depending on the second system energy interface at the first nominal voltage.

For example, the electrical powers that the storage modules 100*a*-100*h* can provide is 5 kW each. According to the embodiment shown in FIG. 7, the electrical power that the system can provide depending on the second system energy interface is 8.5 kW at 48 V. According to the embodiment shown in FIG. 10, the electrical power that the system can provide depending on the first system energy interface is 40 kW at 48 V.

This can be advantageous in applications that require driving higher currents in a range of the first nominal voltage, of 48 V, such as a 48 V motor or machine in a vehicle or the like.

Furthermore, this can be advantageous if both the driving of the vehicle and an on-board energy supply of the vehicle require a voltage in a range of the first nominal voltage, of 48 V.

Figure 11:
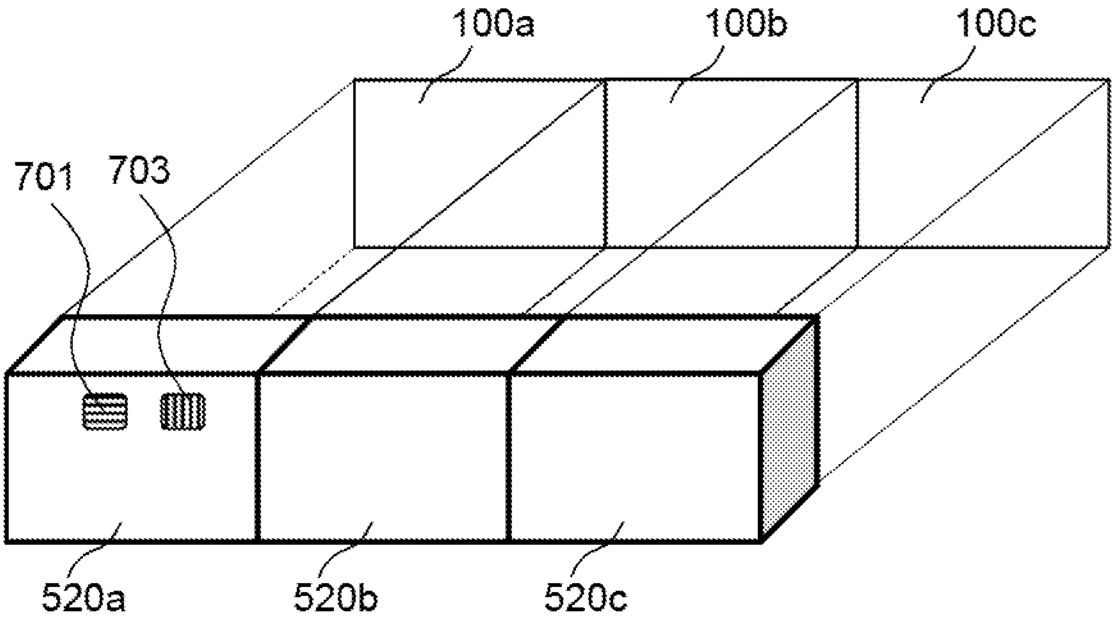
FIG. 11 is a third schematic drawing of the second system.

FIG. 11 shows a third schematic drawing of the second system. The third schematic drawing of the second system is representative of a three-dimensional projection of the first system.

For clarity, only the storage modules 100*a*-100*c*, and the processing modules 520*a*-520*c* are explicitly shown.

Further, the second system shown in FIG. 11 includes the first system energy interface in the form of terminals 701, 703.

Figure 12:
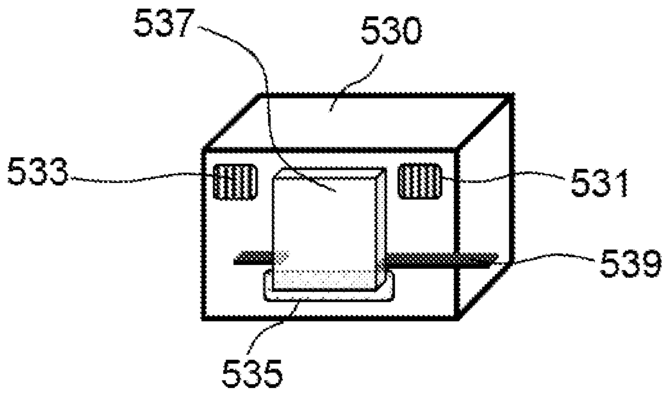
FIG. 12 is a first schematic drawing of a processing module.

FIG. 12 shows a schematic drawing of a first embodiment of a processing module 530.

The processing module 530 has the same characteristics as the processing module 500 shown in FIG. 4.

The processing module 530 includes an energy interface. The energy interface is in the form of a first terminal 531 representative of a positive terminal of the processing module 530 and a second terminal 533 representative of a negative terminal of the processing module 530.

The terminals 101, 103 of the storage module 100 are arranged on an outer surface of the storage module 100, for example.

For example, the terminals 531, 533 of the processing module 530 are disposed on an outer surface of the processing module 530.

The terminals 531, 533 shown in FIG. 12 are shaped such that the processing module 530 can be mechanically and/or electrically coupled to the storage module 100 such that when the outer surface of the storage module 100 faces the outer surface of the processing module, the processing module 530 can be coupled together along an axis connecting the two outer surfaces. This may also be referred to as horizontal coupling.

Further, the processing module 530 includes a second communication interface 535 having the same characteristics as the first communication interface 105 shown in FIG. 1.

Further, the processing module 530 includes a first monitoring module 537 and a DC-DC converter 537 formed together in a structural unit. Additionally, this structural unit may include a plug-in contact or the like to electrically and/or mechanically couple or decouple the structural unit to the processing module 530.

Further, the processing module 530 includes a third communication interface 539, which may be a flat conductor and/or a foil conductor.

For example, the third communication interface 539 may be configured to receive processing data from or provide processing data to another processing module.

Referring to FIG. 12, the third communication interface 539 is located on a front side of the processing module 530.

Figure 13:
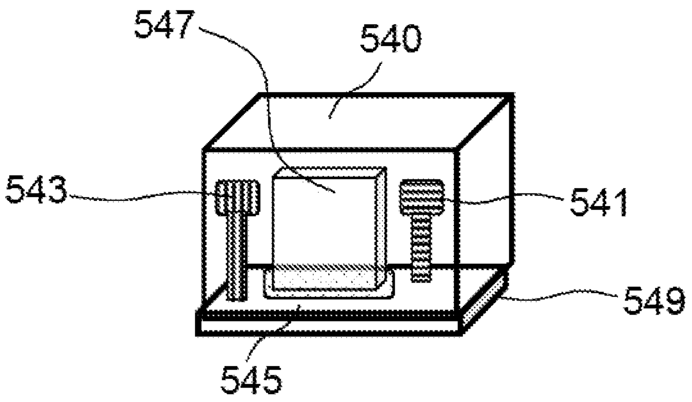
FIG. 13 is a second schematic drawing of a processing module.

FIG. 13 shows a schematic drawing of a second embodiment of a processing module 540.

The processing module 540 has the same characteristics as the processing module 530, but the terminals 541, 543 of FIG. 13 are shaped such that the processing module 540 can be mechanically and/or electrically coupled to the storage module 100 such that when the outer surface of the storage module 100 faces the outer surface of the processing module, the processing module 530 can be coupled together along an axis that is parallel to the outer surfaces. This may also be referred to as vertical coupling.

The invention claimed is:

1. An energy storage system, comprising:
- a first system energy interface for providing electrical energy at a first system output voltage,
- a first storage module for storing electrical energy, the first storage module comprising:
  - a first energy interface configured to provide electrical energy at a first nominal voltage,
  - a first cell stack comprising a plurality of individual cells,
  - a first communication interface configured to provide first monitoring data relating to a monitoring of the plurality of individual cells,
- the energy storage system further comprises:
- a first processing module comprising:
  - a second energy interface configured to exchange electrical energy with the first energy interface at the first nominal voltage,
  - a second communication interface configured to receive the first monitoring data,
  - a first monitoring module configured to monitor the plurality of individual cells depending on the monitoring data,
  - a DC/DC converter,
  - a third communication interface configured to receive processing data from a second processing module or to provide processing data to the second processing module,
  - the first system energy interface, and
- wherein the energy storage system is configured to electrically couple the first storage module to a second storage module depending on the first processing module and the second processing module.

2. The energy storage system of claim 1, wherein the system comprises the second storage module and the second processing module.

3. The energy storage system according to claim 2, wherein the first cell stack comprises a plurality of sub-cell stacks connected in series and/or in parallel, the sub-cell stacks comprise the plurality of individual cells, the sub-cell stacks are each configured to provide electrical energy at a second nominal voltage, the second nominal voltage being less than or equal to the first nominal voltage, the first cell stack comprises, for each sub-cell stack, a respective DC-DC converter and a respective sub-cell stack monitoring module configured to monitor the respective sub-cell stack.

4. The energy storage system of claim 3, wherein the first storage module comprises a third energy interface configured to provide electrical energy at the second nominal voltage.

5. The energy storage system according to claim 4, wherein each of the sub-cell stacks comprises a subset of the plurality of individual cells, wherein the individual cells of the respective subset are connected in series and/or in parallel, each of the sub-cell stacks comprises, for each individual cell of the respective subset, a respective DC-DC converter and a respective cell monitoring module configured to monitor the respective individual cell.

6. The energy storage system of claim 2, wherein the first storage module and the second storage module are electrically coupled depending on the first processing module and the second processing module, such that the first storage module and the second storage module are connected in parallel.

7. The energy storage system of claim 2, wherein the first storage module and the second storage module are electrically coupled depending on the first processing module and the second processing module, such that the first storage module and the second storage module are connected in series.

8. The energy storage system of claim 7, wherein the system comprises a second system energy interface for providing electrical energy at a second system output voltage.

9. The energy storage system according to claim 8, wherein the system comprises a third storage module and a third processing module, the second system output voltage is provided depending on the third storage module.

10. Vehicle comprising the energy storage system according to claim 1.

* * * * *